United States Patent
Acosta

(10) Patent No.: US 8,763,629 B1
(45) Date of Patent: Jul. 1, 2014

(54) DOUBLE ACTION FLOAT VALVE

(71) Applicant: Hugo Antonio Munoz Acosta, Chihuahua (MX)

(72) Inventor: Hugo Antonio Munoz Acosta, Chihuahua (MX)

(*) Notice: Subject to any disclaimer, the term of this patent is extended or adjusted under 35 U.S.C. 154(b) by 0 days.

(21) Appl. No.: 14/035,672

(22) Filed: Sep. 24, 2013

Related U.S. Application Data

(60) Provisional application No. 61/798,996, filed on Mar. 15, 2013.

(51) Int. Cl.
*F16K 31/20* (2006.01)

(52) U.S. Cl.
USPC .......................................... 137/391; 137/423

(58) Field of Classification Search
USPC .................................. 137/391, 430, 403, 423
See application file for complete search history.

(56) References Cited

U.S. PATENT DOCUMENTS

| | | | |
|---|---|---|---|
| 805,003 A | 11/1905 | Clarey | |
| 1,176,785 A | 3/1916 | Stielow | |
| 1,340,999 A | 5/1920 | Wilson | |
| 1,704,501 A | 3/1929 | Force | |
| 2,155,400 A | 4/1939 | Caminiti | |
| 2,384,628 A | 9/1945 | Krone et al. | |
| 2,715,414 A | 8/1955 | Kinzbach et al. | |
| 2,716,422 A | 8/1955 | Whitlock, Jr. | |
| 3,662,793 A | 5/1972 | Calisher et al. | |
| 4,051,030 A | 9/1977 | Huiet, Jr. | |
| 4,193,417 A | 3/1980 | Bowman | |
| 4,735,226 A | 4/1988 | Szlaga | |
| 4,905,726 A | 3/1990 | Kasugai et al. | |
| 4,991,615 A | 2/1991 | Szlaga et al. | |
| 6,296,016 B1 | 10/2001 | Parker et al. | |
| 7,584,766 B2 | 9/2009 | David et al. | |

*Primary Examiner* — Craig Schneider
(74) *Attorney, Agent, or Firm* — Gunn, Lee & Cave P.C.

(57) ABSTRACT

The double action float valve is connected to a single pipe and a tank and controls both the filling and discharge of the tank. The double action float valve utilizes a valve body, a heavy filling obturator positioned within the valve body, a light inverse obturator positioned within the heavy filling obturator, and a float connected to the heavy filling obturator. When the inflow pressure from the pipe is greater than the outflow pressure of the tank, the tank is filled until the float reaches a predetermined level. When the outflow pressure of the tank is greater than the inflow pressure, the double action float valve is automatically reconfigured to discharge the fluid from the tank into the pipe.

28 Claims, 5 Drawing Sheets

DOUBLE ACTION FLOAT VALVE

CROSS-REFERENCES TO RELATED APPLICATIONS

This application claims the benefit of U.S. provisional application Ser. No. 61/798,996 filed Mar. 15, 2013 entitled Double Action Float Valve, which is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention relates to the field of flow valves as used in the filling and discharge of fluid from a tank.

2. Description of the Related Art

There are several different kinds of float valves that are used to control the filling of tanks. A basic float valve system is the direct-operated float valve. This system is installed in the upper part of a tank and when the tank is full the float pushes or pulls a piston resulting in the stoppage of flow into the tank. When the pressure is high, the float doesn't have enough power to stop the flow of fluid which results in leaks. To overcome this issue in larger tanks, more sophisticated float valves are utilized which results in higher cost.

There are other valves, such as pilot operated, that may be used in high pressures or with large diameter pipes. In this system, when the tank is full, the valve is closed using line pressure. These types of valves are complex and require multiple parts to ensure proper function.

The methods listed above require a pipe to fill the tank and an additional pipe to discharge liquid from the tank. This requires additional cost to construct, maintain, and increases the risk of problems occurring within the lines.

There is a need for a double action float valve that can work on a single line for both inflow and outflow as well as in high pressure applications.

SUMMARY OF THE INVENTION

The objective of the double action float valve is to supply a new valve that is superior to the current float valves on the market. The primary advantage to the double action float valve is the ability to operate through a single inflow and outflow pipe.

The double action float valve utilizes a valve body mounted in a tank. The valve body is connected to an inflow/outflow pipe that is connected to a liquid supply. A heavy filling obturator and a light inverse float obturator are located within the valve body. The heavy filling obturator is connected to a float that is positioned outside the valve body and within the tank. When the pressure of liquid from the inflow/outflow pipe is greater than the pressure from the tank, as measured at the outlet of the valve body into the tank, liquid enters the valve body, passes through ports in the first obturator, through the interior of the valve body and into the tank. Once the float reaches a predetermined level in the tank the fluid communication between the inflow pipe and the tank is closed due to the positioning of the heavy filling obturator and the light inverse obturator.

When the pressure from the tank, as measured at the outlet of the valve body into the tank, is greater than the inflow pressure from the pipe, the resulting pressure causes the light inverse obturator to move away from the outlet of the valve body causing liquid to enter the interior of the first obturator, into the interior of the valve body and out through the pipe. Once the liquid level drops from the predetermined level, the float becomes slack allowing the heavy filling obturator to disengage from the valve body. Liquid then flows through the opening of the valve body, into the interior of the valve body, through the ports of the heavy filling obturator and out the inflow/outflow pipe.

The double action float valve was designed with the object of having a simple and effective valve to control the filling and discharge of tanks, using a small external float and with capacity to support high pressures free of leaks. These valves are simple, formed with wearing-free rough pieces, and can be manufactured for low and high pressures. For its simplicity, the double action float valve will work though many years without any maintenance.

DETAILED DESCRIPTION OF THE INVENTION

Figure 1:
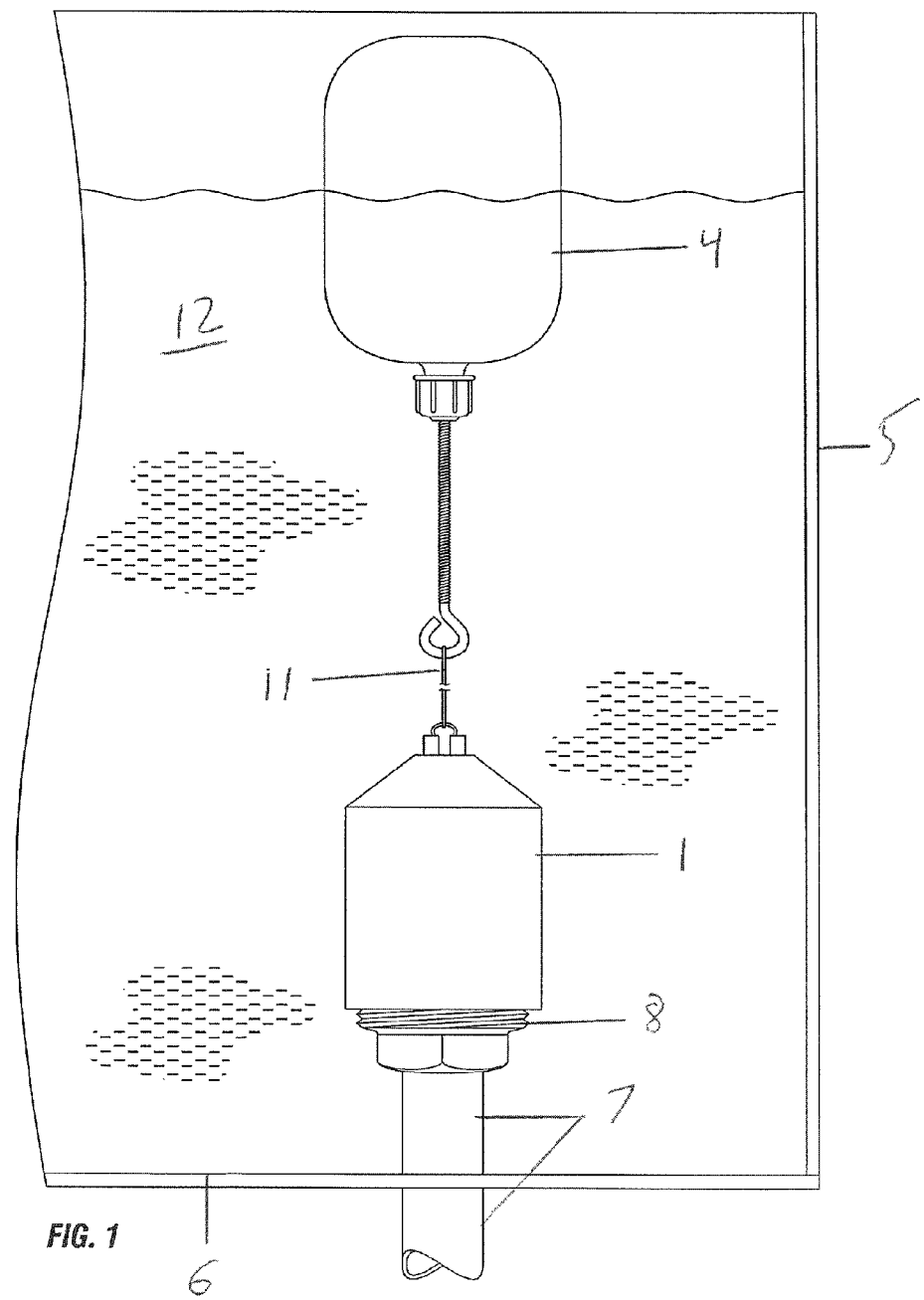
FIG. 1 is a profile view of the preferred embodiment.
Figure 2:
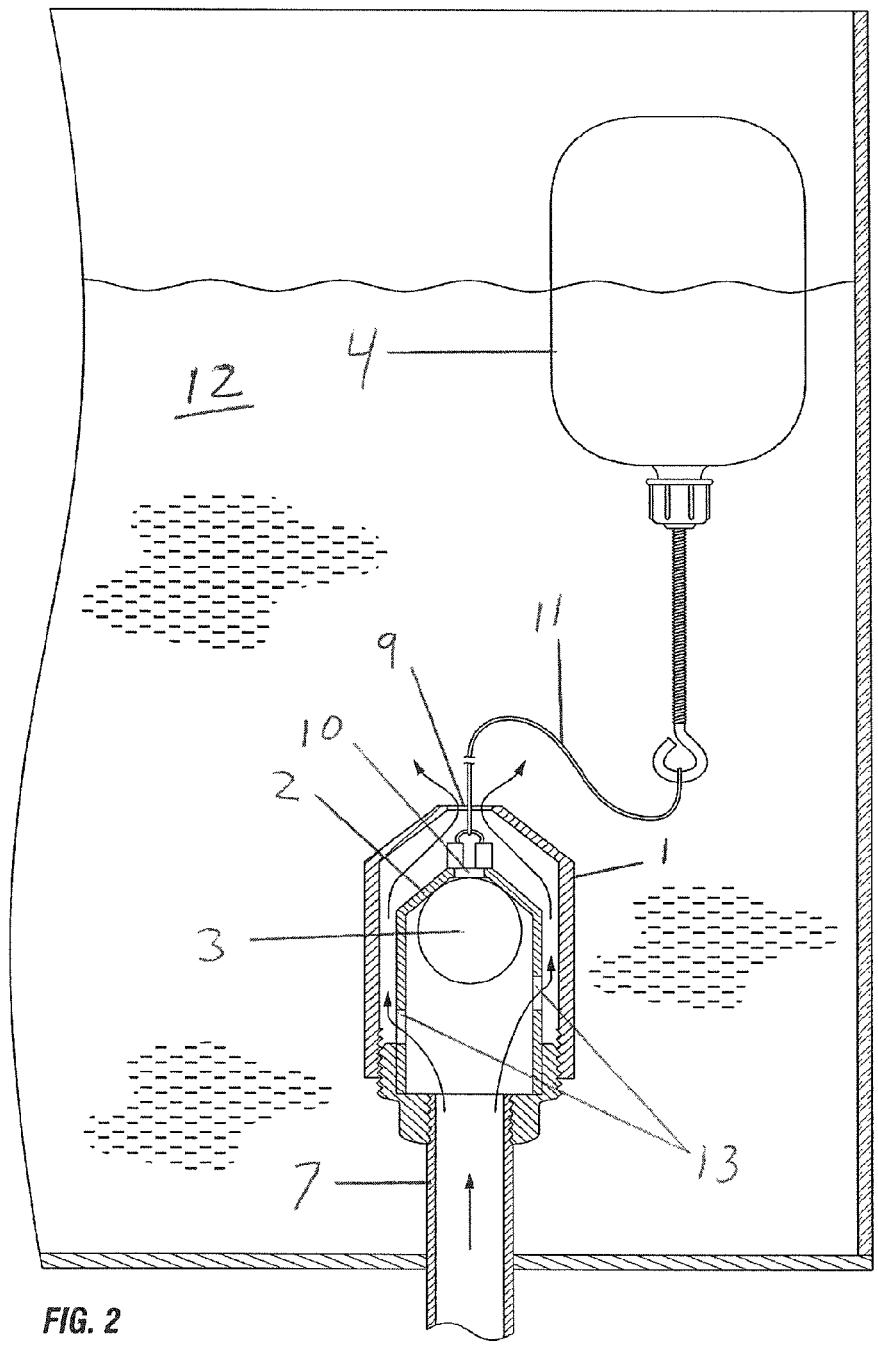
FIG. 2 is a cross-section view of the preferred embodiment during inflow of a liquid.

Referring to FIGS. 1 and 2, the double action float valve is preferably installed at the bottom 6 of a tank 5. The valve body 1 is connected to the inflow/outflow pipe 7 with a connector 8 which may be a screw, glue, coupling, flange or any standard method of connecting a pipe to a valve body. Within the valve body 1 is a heavy filling obturator 2 and a light inverse float obturator 3. The heavy filling obturator 2 is connected to an external float 4 via linkage 11. Linkage 11 may be flexible and is strong enough to hold the heavy filling obturator 2 against the body 1 without breaking. Examples of linkage depend on the weight of the heavy filling obturator 2 but such linkage may be a chain, rope, plastic line, or cable.

FIG. 2 is a cross section of the valve components found in FIG. 1. In the preferred embodiment, valve body 1 has a cylindrical body and a cone-shaped top. Circular orifice 9 is located as the apex of the cone shaped top. Circular orifice 9 allows for fluid communication between the tank 5 and inflow/outflow pipe 7.

In the preferred embodiment, heavy filling obturator 2 also has a cylindrical body and a cone-shaped top similar to the valve body 1 but smaller in scale. The cylindrical body of the heavy filling obturator 2 contains several fluid communication holes 13 spaced around the cylindrical body. These fluid communication holes allow for fluid communication between the interior of valve body 1 and the interior of heavy filling obturator 2. In an alternative embodiment, the cylindrical body of the heavy filling obturator 2 is made of screen. The reduction of weight will allow for a lighter external float 4 and for a less structurally demanding linkage 11. The bottom end, facing the inflow/discharge pipe, is open allowing for fluid communication between the inflow/discharge pipe and the interior of the heavy filling obturator 2. Circular orifice 10 is located at the apex of the cone shaped top of heavy filling obturator 2. Preferably, the diameter of the circular orifice 10 of heavy filling obturator 2 is smaller than the diameter of circular orifice 9 of valve body 1.

FIG. 2 shows double action float valve in operation when the tank is not full and there is a supply of fluid flowing from the inflow/discharge pipe to the double action float valve. When the tank 5 is not full of fluid 12, the linkage 11 connecting the external float 4 is lax with respect to heavy filling obturator 2. As a result, heavy filling obturator 2 is sitting on the base of the valve body 1, or alternatively sitting on the connector 8. Preferably, fluid flows from the inflow/discharge pipe 7 into the interior cavity of the heavy filling obturator 2. The pressure of the inflow pushes the light inverse float obturator 3 against the circular orifice 10 of the heavy filling obturator 2, preventing flow through the circular orifice 10. As a result, fluid flows from the interior cavity of the heavy filling obturator 2 through fluid communication holes 13 into the interior cavity of the valve body 1. The fluid then flows in the space between the heavy filling obturator 2 and the valve body 1 and out through the circular orifice 9 of the valve body 1 into the tank 5.

Figure 3:
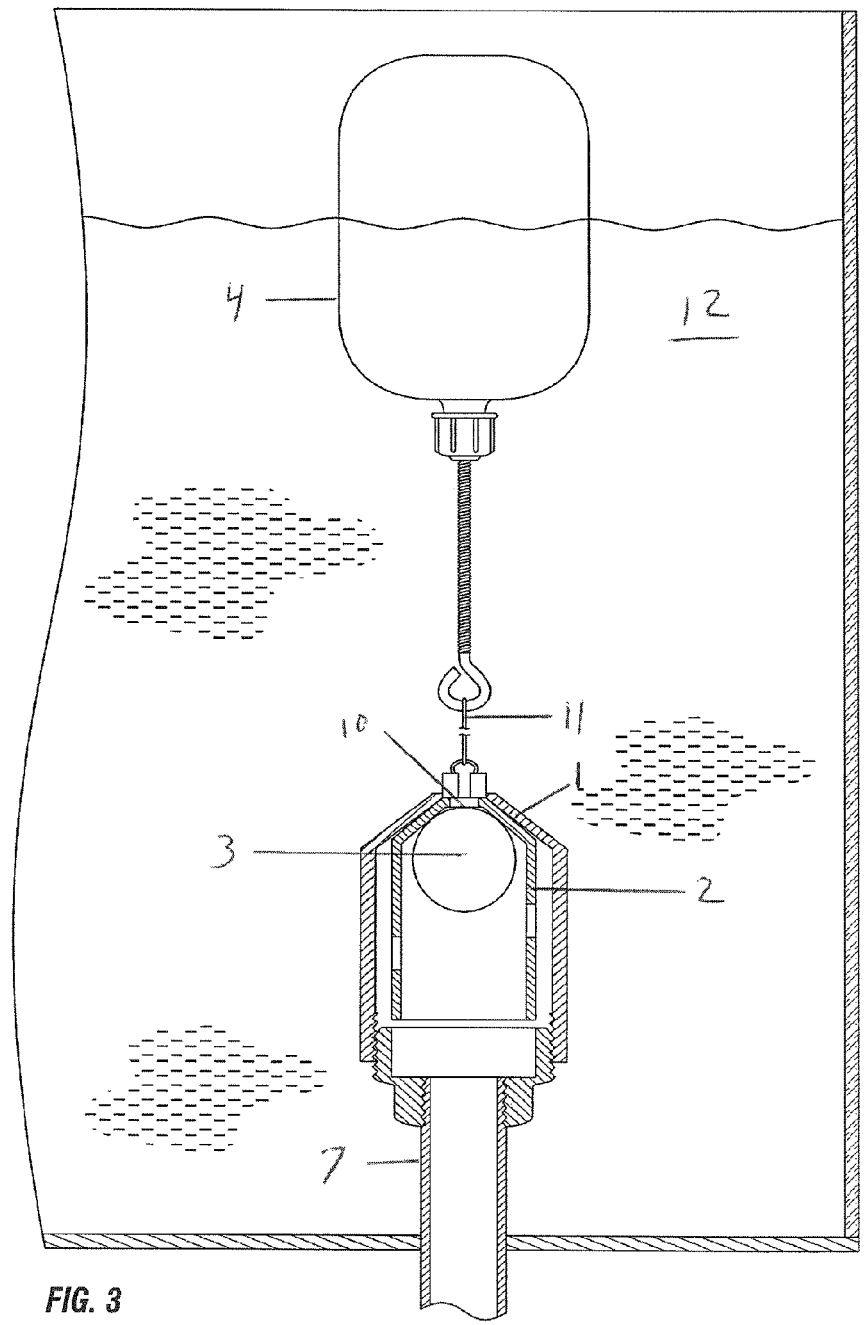
FIG. 3 is a cross-section view of the preferred embodiment when the tank is full.

As the tank 5 fills with fluid, the external float 4 rises as the fluid level increases. As the fluid level increases, the linkage 11 becomes more taught and when the tank 5 becomes full (i.e. when the tank reaches a predetermined level based on the length of the linkage) then the external float 4 pulls the heavy filling obturator 2 against the circular orifice 9 of valve body 1 as shown in FIG. 3. When the linkage is fully taught, the heavy filling obturator 2 abuts the valve body and prevents fluid flow to and from the circular orifice 9 along a fluid communication path in the space between the heavy filling obturator 2 and the valve body 1. Due to continued fluid pressure from the inflow, light inverse float obturator 3 continues to abut circular orifice 10 of the heavy filling obturator 2 which as a result, blocks the fluid communication path through circular orifice 10. With circular orifice 10 as well as the fluid communication path in the space between the heavy filling obturator 2 and the valve body 1 blocked, fluid communication from the inflow/outflow pipe to the tank is cutoff. The light inverse float obturator 3 will remain in its position against the circular orifice 10 so long as there is pressure coming in from the inflow pipe. The higher the intake pressure the greater the force of the light inverse float obturator 3 against circular orifice 10.

Alternatively to maintaining a constant pressure inflow, a check valve may be utilized to keep fluid from flowing out of the tank 5.

To change the level of tank fill, the operator simply needs to lengthen or shorten the linkage 11 so that external float 4 pulls the linkage taught at the predetermined level.

Figure 4:
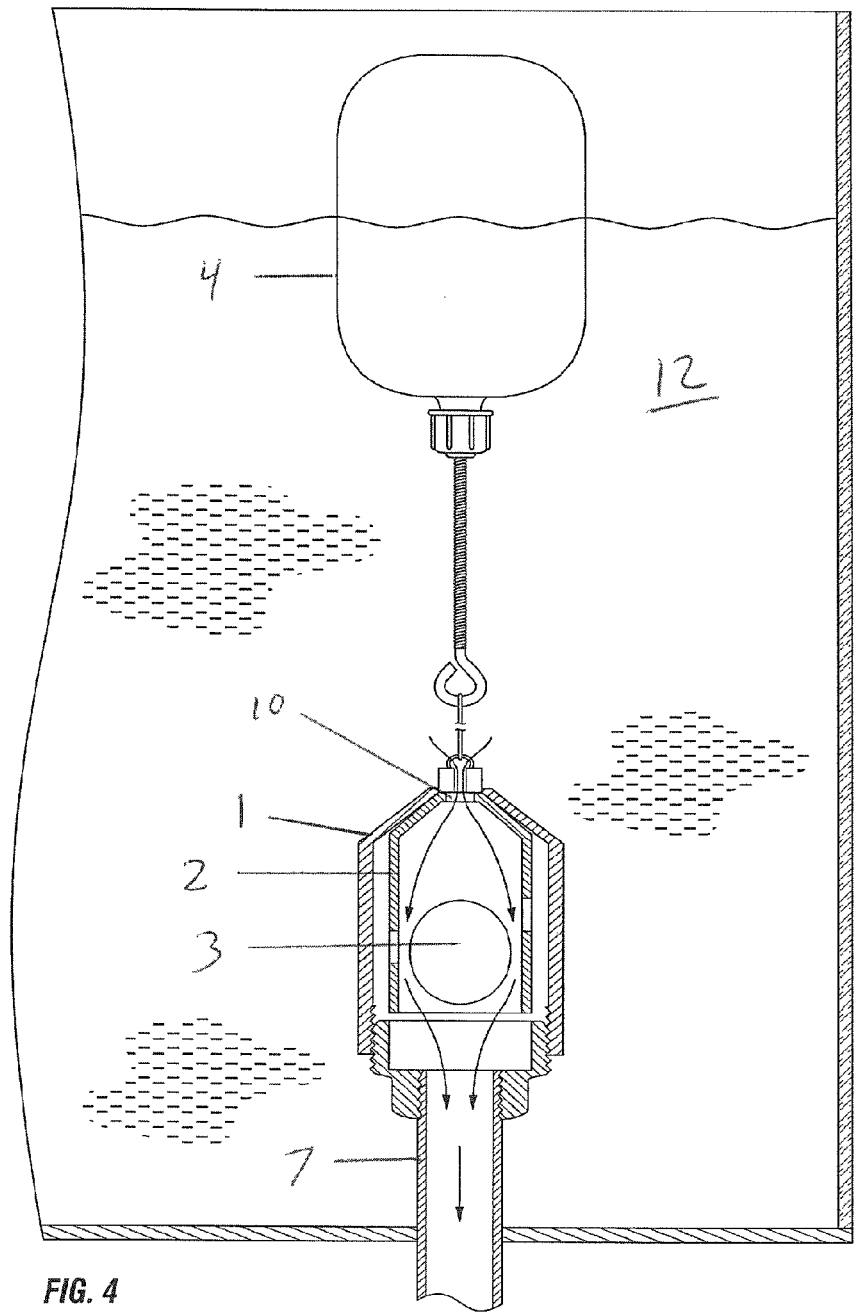
FIG. 4 is a cross-section view of the preferred embodiment when the pressure in the tank exceeds the pressure in the inflow pipe.
Figure 5:
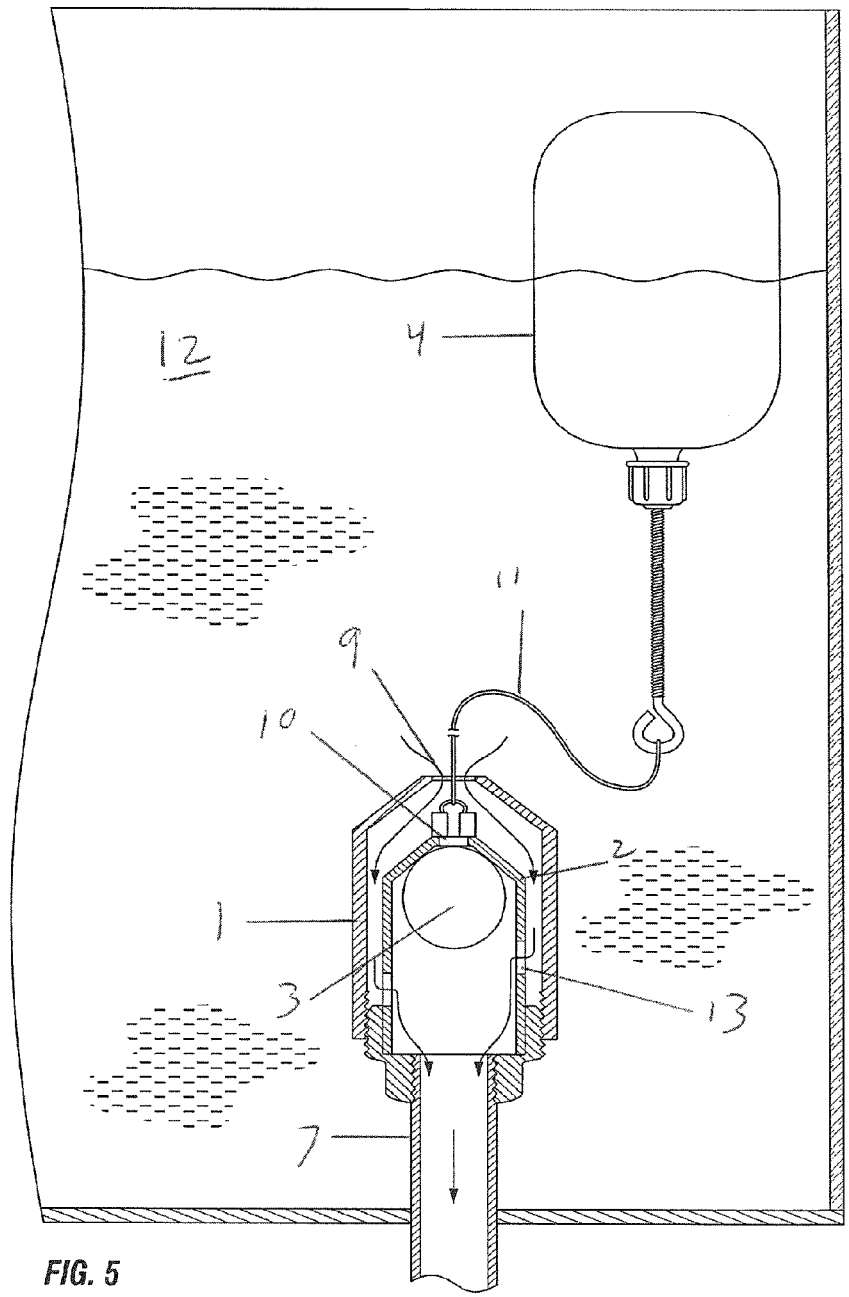
FIG. 5 is a cross-section view of the preferred embodiment during outflow of a liquid.

Referring now to FIG. 4, if the pressure from the inflow pipe is lower than the downward fluid pressure in the tank at the level of light inverse float obturator, then the fluid pressure will push the light inverse float obturator 3 away from the circular orifice 10 into the interior cavity of the heavy filling obturator 2 and towards the inflow/outflow pipe 7 allowing fluid to enter the interior cavity of the heavy filling obturator through orifice 9, 10 and exit through inflow/outflow pipe. Once the level in the tank 5 is lowered enough that slack begins to form in linkage 11, the heavy filling obturator 2 will disengage from circular orifice 9 of valve body 1 as shown in FIG. 5. Once this occurs, fluid flows through the circular orifice 9 into interior cavity of valve body 1, through the fluid communication holes 13 into the interior cavity of the heavy filling obturator 2 and out the inflow/outflow pipe 7. The double action float valve can be manufactured with metallic or non-metallic materials, such as plastic, resins, etc. It can handle any type of liquids, corrosive and non-corrosive. The double action float valve may be applied to pipes of virtually all sizes. The double action float valve is to be preferably installed at the bottom of the tank. However, it is anticipated that it can be installed at various levels. The double action float valve is light, simple, and made with a small number of pieces, which makes it economic and unlikely to fail.

The double action float valve has numerous applications from city water systems utilizing water towers for peak demand to home use. The design of the double action float valve allows for use with a water supply that has an elevation higher than the tank or for use with a water supply that has a pumping station.

The present invention is described above in terms of a preferred illustrative embodiment of a specifically-described double action float valve. Those skilled in the art will recognize that alternative constructions of such a device can be used in carrying out the present invention. Aspects such as the shape of the circular orifices, shape of the valve body, heavy filling obturator, and light inverse float obturator are changeable without affecting the principles of the invention. Other aspects, features, and advantages of the present invention may be obtained from a study of this disclosure and the drawings, along with the appended claims.

I claim:

1. A float valve comprising:
   a valve body forming a first walled enclosure and having a first opening in fluid communication with a fluid inlet and a second opening positioned at the top of said valve body in fluid communication with the interior of a tank capable of storing a fluid;
   a first obturator having a density greater than the density of said fluid, positioned within said valve body;
   said first obturator forming a second walled enclosure and having a first opening positioned at the bottom end of said first obturator, a second opening positioned at the top end of said first obturator and at least one perforation in said wall of said first obturator in fluid communication with the interior of said valve body;
   a second obturator having a density which is less than said density of said fluid, positioned within said enclosure of said first obturator; and
   a float connected to said first obturator.

2. The float valve of claim 1 wherein said first obturator can move between first position wherein said first obturator abuts said valve body and a second position wherein said first obturator is positioned away from said valve body.

3. The float valve of claim 2 wherein the vertical level of said float causes the first obturator to move between said first position and said second position.

4. The float valve of claim 2 wherein said second obturator moves between a first position wherein said second obturator abuts said first obturator and a second position wherein said second obturator is positioned away from said first obturator.

5. The float valve of claim 4 wherein fluid flow to and from said second opening of said valve body is blocked when said first obturator is in said first position and said second obturator is in said first position.

6. The float valve of claim 1 wherein said first obturator moves between a first position wherein said first obturator blocks a first fluid communication path and a second position wherein said first fluid communication path is unblocked, said first fluid communication path being the path wherein fluid passes to and from said second opening of said valve body through a space between said first obturator and said valve body.

7. The float valve of claim 6 wherein said second obturator moves between a first position wherein said second obturator blocks a second fluid communication path and a second position wherein said second fluid communication is unblocked, said second fluid communication path being the path through said second opening of said first obturator.

8. The float valve of claim 1 wherein said float is connected to said first obturator through a mechanical linkage disposed through said second opening of said valve body.

9. The float valve of claim 8 wherein at least a portion of said mechanical linkage is flexible.

10. The float valve of claim 9 wherein said flexible mechanical linkage is adjustable.

11. The float valve of claim 1 wherein said valve body further comprises a frusto-conical section and wherein said second opening is positioned at the apex of said frusto-conical section.

12. The float valve of claim 11 wherein said first obturator further comprises a frusto-conical section wherein said second opening is positioned at the apex of said frusto-conical section.

13. The float value of claim 1 wherein said at least one perforation is a plurality of perforations.

14. The float valve of claim 1 wherein said at least one perforation in said wall of said first obturator is a screen.

15. The float valve of claim 7 further comprising a third fluid communication path wherein fluid passes to and from the interior of said first obturator and said space between said first obturator and said valve body through said at least one perforation in said wall of said first obturator.

16. The float valve of claim 1 wherein
said valve body further comprises a top wall and a side wall;
said first obturator further comprises a top wall and a side wall;
said second opening of said valve body is through said top wall of said valve body;
said second opening of said first obturator is through the top wall of said first obturator; and
said first opening of first said obturator is positioned at the bottom end of said side wall of said first obturator.

17. The float valve of claim 16 wherein said first obturator can move between first position wherein said top wall of said first obturator abuts said top wall of said valve body and a second position wherein said top wall of said first obturator is positioned away from said top wall of said valve body.

18. A fluid filling and draining system for a storage tank comprising:
a fluid storage tank;
a fluid inlet associated with said storage tank;
a valve body having an interior space in fluid communication with said inlet and said storage tank;
a first obturator having an interior space positioned within said valve body;
a second obturator positioned within said first obturator;
a float linked to said first obturator;
a first fluid communication path wherein fluid passes to and from an opening at the top of said valve body through a space between said first obturator and said valve body; and
a second fluid communication path wherein fluid passes through an opening at the top of said first obturator.

19. The fluid filling and draining system for a storage tank of claim 18 wherein said first obturator can move between a first position wherein said first fluid communication path is blocked and a second position wherein said first fluid communication path is unblocked.

20. The fluid filling and draining system for a storage tank of claim 19 wherein said second obturator can move between a first position wherein said second fluid communication is blocked and a second position wherein said second fluid communication path is unblocked.

21. The fluid filling and draining system for a storage tank of claim 18 further comprising a third fluid communication path wherein fluid passes to and from the interior of said first obturator and said space between said first obturator and said valve body through at least one opening in a side wall of said first obturator.

22. The fluid filling and draining system for a storage tank of claim 18 wherein the flow of fluid from said valve body into said storage tank is blocked when both said first fluid communication path and said second communication path are blocked.

23. The fluid filling and draining system for a storage tank of claim 18 wherein said first obturator can move between first position wherein said first obturator abuts said valve body and a second position wherein said first obturator is positioned away from said valve body.

24. The fluid filling and draining system for a storage tank of claim 23 wherein the vertical level of said float causes the first obturator to move between said first position and said second position.

25. The fluid filling and draining system for a storage tank of claim 23 wherein said second obturator moves between a first position wherein said second obturator abuts said first obturator and a second position wherein said second obturator is positioned away from said first obturator.

26. A method of filling and discharging a tank comprising:
providing the flow of a fluid into said tank from an inlet wherein said flow creates a fluid intake pressure;
passing said fluid through a valve wherein said valve comprises a valve body having an opening at its top, a first obturator having an opening at its top within said valve body and a second obturator within said first obturator;
passing said fluid through a first fluid communication path wherein said first fluid communication path passes fluid to and from said opening at the top of said valve body through a space between said valve body and said first obturator;
passing said fluid through a second fluid communication path wherein said second fluid communication path passes fluid through said opening at the top of said first obturator;
blocking said first fluid communication path with said first obturator when the fluid level in said tank reaches a first level; and
blocking said second fluid communication path with said second obturator.

27. A method of filling and discharging a tank of claim 26 further comprising:
decreasing said fluid intake pressure;
unblocking said second fluid communication path with said second obturator when said fluid intake pressure is less than the fluid pressure at said opening at said top of said first obturator; and
lowering the fluid level in said tank by passing fluid through said opening at said top of said valve body and said second fluid communication path and out of said inlet.

28. A method of filling and discharging a tank of claim 27 further comprising:
unblocking said first fluid communication path with said first obturator; and lowering the fluid level in said tank by passing fluid through said opening at said top of said valve body and said first fluid communication path and out of said inlet.

* * * * *